United States Patent
Sturm

[15] 3,677,157
[45] July 18, 1972

[54] CONTROL, SIGNAL AND ACTUATING MECHANISM FOR USE WITH PHOTOFLASH LAMP UNITS HAVING PRE-ENERGIZED STRIKERS

[72] Inventor: Edward L. Sturm, Rochester, N.Y.
[73] Assignee: Eastman Kodak Company, Rochester, N.Y.
[22] Filed: Oct. 14, 1968
[21] Appl. No.: 767,145

[52] U.S. Cl. ........................................................95/11.5 R
[51] Int. Cl. .............................................................G03b 15/04
[58] Field of Search ....................95/11, 11 L, 11.5; 431/92, 431/93

[56] References Cited

UNITED STATES PATENTS

| | | | |
|---|---|---|---|
| 3,463,067 | 8/1969 | Fauth et al. | 95/11 L |
| 3,383,995 | 5/1968 | Bresson | 95/11.5 |
| 3,439,597 | 4/1969 | Wagner | 95/11.5 |
| 590,204 | 9/1897 | Blackmore | 95/11.5 |
| 1,671,406 | 5/1928 | Clergy | 431/92 |
| 3,087,318 | 4/1963 | Oswold | 240/1.3 |
| 3,259,043 | 7/1966 | Pagel | 95/11 X |
| 3,286,612 | 11/1966 | Lieser | 95/11 |
| 3,439,992 | 4/1969 | Shaffer et al. | 431/93 |
| 3,473,454 | 10/1969 | Stutz et al. | 95/11 |

Primary Examiner—Samuel S. Matthews
Assistant Examiner—M. L. Gellner
Attorney—Robert W. Hampton and John D. Husser

[57] ABSTRACT

A sensing probe movable into contact with a pre-energized striker element of a percussion-ignitable photoflash lamp in response to partial actuation of the shutter release of a camera. In response to the sensing probe, a signal is presented in the camera view finder and/or the shutter release lever is locked to prevent picture-taking. A control is provided to prevent operation of the sensing member when a flash unit is not mounted in the camera. The striking element is released by first non-releasingly engaging the striker with an actuating member, then striking the member to effect release.

13 Claims, 8 Drawing Figures

Patented July 18, 1972

EDWARD L. STURM
INVENTOR.

BY John W. Husser
R. W. Hampton

ATTORNEYS

EDWARD L. STURM
INVENTOR.

BY John D. Hussey
R. W. Hampton

ATTORNEYS 3,677,157

CONTROL, SIGNAL AND ACTUATING MECHANISM FOR USE WITH PHOTOFLASH LAMP UNITS HAVING PRE-ENERGIZED STRIKERS

CROSS-REFERENCE TO RELATED APPLICATIONS

Reference is made to copending commonly assigned U.S. application Ser. No. 765,930, entitled "Multilamp Flash Unit," filed Oct. 8, 1968, is now Pat. No. 3612849, in the name of David E. Beach and U.S. application Ser. No. 766,751, entitled "Percussion-Ignitable Flash Unit Having Contact-Actuatable, Pre-Energized Strikers and Photographic Apparatus Using Such Units," filed Oct. 11, 1968 is now U.S. Pat. No. 3596581, in the names of Joseph V. Poweska and Jeffrey R. Stoneham.

BACKGROUND OF INVENTION

1. Field of Invention

The present invention relates to flash photography and more specifically to actuating signal and control apparatus for use in conjunction with flash lamps fireable by striking, for example, percussion-ignitable flash lamps.

2. Description of Prior Art

Recently, in order to obviate the necessity for providing an electrical source and circuit in photoflash apparatus, a percussion-ignitable photoflash lamp has been developed. One such percussion-ignitable flash lamp is disclosed in U.S. application Ser. No. 765,930, entitled "Multilamp Flash Unit" and filed Oct. 8, 1968, in the name of David E. Beach. Such units in general employ lamps having an envelope containing a combustible material such as shredded zirconium foil and a combustion supporting gas such as oxygen, sealed in the envelope at a pressure of several atmospheres. A percussion activatable ignition tube is provided at the bottom end of such lamps, with the top of the ignition tube opening into the lamp envelope and the bottom end of the tube closed and extending outside the envelope to a location suitable for percussion striking. The ignition tube contains an anvil rod coated with percussion-sensitive material such as a mixture of zirconium and fulminate; and, upon striking the tube the material is activated and ignites the combustibles in the envelope through the open end of the ignition tube.

Another type of percussion-ignitable photoflash unit is disclosed in U.S. application Ser. No. 766,751, entitled "Percussion-Ignitable Flash Unit Having Contact-Actuatable, Pre-Energized Strikers and Photographic Apparatus Using Such Units," and filed Oct. 11, 1968 in the names of Joseph V. Poweska and Jeffrey R. Stoneham. The flash unit disclosed in this latter application employs percussion-ignitable flash lamps of the type described above; however, this latter flash unit includes individual pre-energized striker elements for the flash lamps, which elements are selectively released by actuating mechanism in the photographic apparatus using the flash unit and move into contact with an ignition tube of their associated flash lamp to fire the flash lamp.

Whereas in previously known electrically-fired photoflash systems, sensing of an unused or used lamp condition could be effected readily by passing a small check current through lamp firing filaments, such a device is not applicable for testing the condition of flash lamps fireable by striking. A problem has existed therefore in providing control and signal mechanism in photographic apparatus which can be used in conjunction with such flash lamps.

SUMMARY OF THE INVENTION

The present invention is addressed to the problems outlined above and provides means for sensing used and unused conditions of percussion-ignitable flash units and for signalling such conditions and/or controlling functions of photographic apparatus in response to such conditions. The present invention also provides means for controlling operation of such sensing means in response to attachment and detachment of flash units on photographic apparatus. The present invention also provides an improved means for actuating flash lamps of the type disclosed in the above mentioned application to Poweska and Stoneham.

It is therefore an object of the present invention to provide means for use in photographic apparatus to sense the condition of flash units fireable by striking and used by the apparatus.

It is another object of the present invention to provide means in photographic apparatus for signalling the condition of such a flash lamp used with the apparatus;

Another object of the present invention is to provide means in photographic apparatus for controlling functions of the apparatus in response to sensed conditions of such flash units used therewith;

Yet another object of the present invention is to provide means in photographic apparatus for sensing conditions of such flash units used therewith and means for controlling the operation of such sensing means;

Still another object of the present invention is to provide a more effective and convenient photographic apparatus for such photoflash units.

BRIEF DESCRIPTION OF THE DRAWINGS

In the detailed description of the preferred embodiments of the invention presented below, reference is made to the accompanying drawings in which like numerals denote like parts and wherein.

DESCRIPTION OF THE PREFERRED EMBODIMENTS

Figure 1:
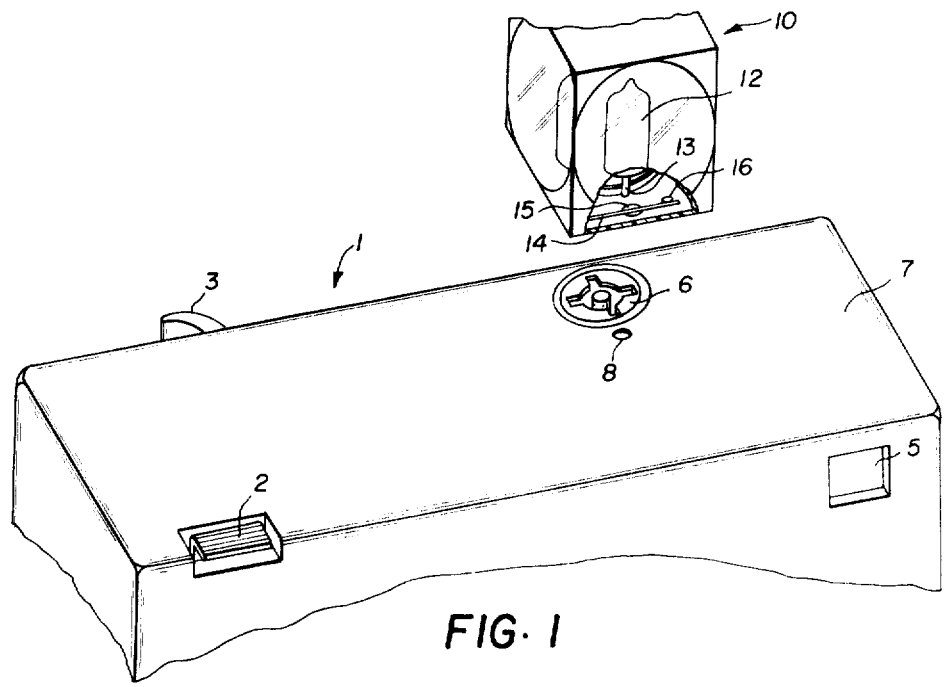
FIG. 1 is a perspective view showing one type of photographic apparatus in which the present invention can be embodied and one type of percussion-ignitable photoflash unit with which the present invention can be used.

In FIG. 1 photographic apparatus, in this instance a camera 1, of the type which can embody the present invention is shown. It can be seen that the camera 1 has shutter release tab 2, film advance lever 3, viewfinder 5 and flash lamp socket 6 of known types. The camera also has an external housing 7 which is provided with an actuator opening 8. Also shown in FIG. 1 is a percussion-ignitable flash unit 10 of the type described in more detail in the aforementioned U.S. Application Ser. No. 766,951, entitled "Percussion-Ignitable Flash Unit Having Contact-Actuatable, Pre-Energized Strikers and Photographic Apparatus Using Such Units." Briefly, the unit 10 comprises a plurality of percussion-ignitable flash lamps 12 with ignition tubes 13 and individual striker elements 14 which are restrained by lugs 16 in a pre-energized condition over actuating sites 15, as shown. The unit 10 is provided with a base (not shown) of known construction which is adapted to be attachably received and supported in socket 6. Because photographic cameras having structure to detachably receive and sequentially index electrically-ignitable multilamp photoflash units and effect picture taking in synchronization with ignition of such flash units are generally known, the present description will be directed to particular elements of such cameras which form a part of or cooperate more directly with the present invention, elements not specifically shown or described herein being understood to be selectable from those known in the art.

Figure 2:
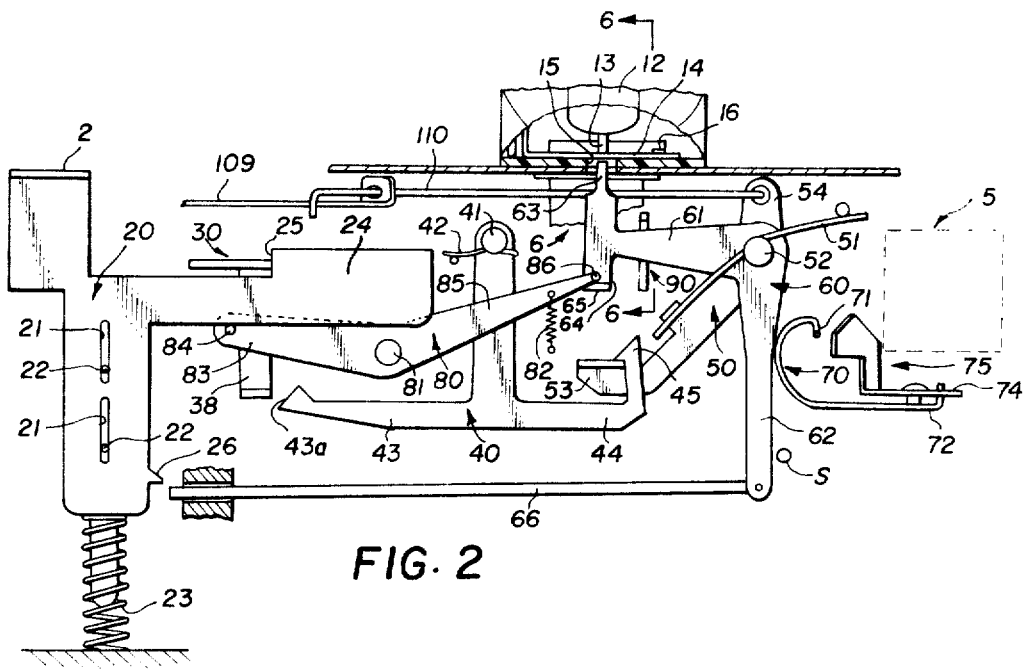
FIG. 2 is a partially schematic view inside the apparatus shown in FIG. 1 showing one embodiment of the present invention as used in conjunction with the flash unit shown in FIG. 1 and with the apparatus in a sensing position.
Figure 5:
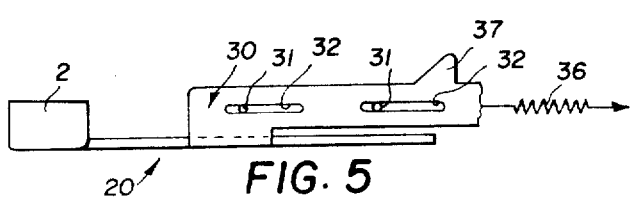
FIG. 5 is a top view of other portions of the apparatus shown in FIG. 2.

Referring now to FIGS. 2 and 5 it can be seen that shutter release tab 2 is an integral portion of shutter release lever 20 which is guided by slots 21 for sliding movement within housing 7 on pins 22, which pins extend from the camera frame. The shutter release lever 20 is biased upwardly by spring 23 and has formed thereon a retaining arm 24 with an engaging edge 25 and a stop lug 26 the purpose of which will be subsequently described.

A shutter driver 30 is shaped and located for engagement in its cocked position by edge 25 of shutter release lever 20 and is guided for sliding movement on pins 31 by slots 32 formed thereon. The shutter driver is biased for movement to the right, as viewed in FIGS. 2 and 5, by drive spring 36, which upon release of the driver 30 by release lever 20 moves the driver so that lug 37 thereof can operate the camera shutter (not shown) in a known manner. The shutter driver 30 also includes an extension 38 which is located for cooperation with latch member 40.

Latch member 40 is pivotally mounted on pin 41 and urged clockwise by spring 42. The latch member includes a release arm 43 terminating in ramped projection 43a and latching arm 44 having a latching finger 45.

Latching member 40 is located in the camera in a position for retaining hammer 50 in a cocked position against the clockwise bias of spring 51. The hammer 50 is rotatable on shaft 52 and includes an impact arm 53 and cocking arm 54.

Mounted on the same shaft 52 as hammer 50 is a lever 60 which includes sensing and actuating arm 61 and a control and signal arm 62. The arm 61 is formed having a finger 63, aligned for movement into and through actuating opening 8 of the camera housing, and an extension 64 having an outwardly protruding rest pad 65. The control arm 62 is connected to a blocking rod 66 which is slidably mounted in the camera frame and extends to a location closely proximate to stop lug 26 on the shutter release lever 20. The lever 60 is lightly biased for clockwise rotation on shaft 52 by spring wire 70.

Figure 4:
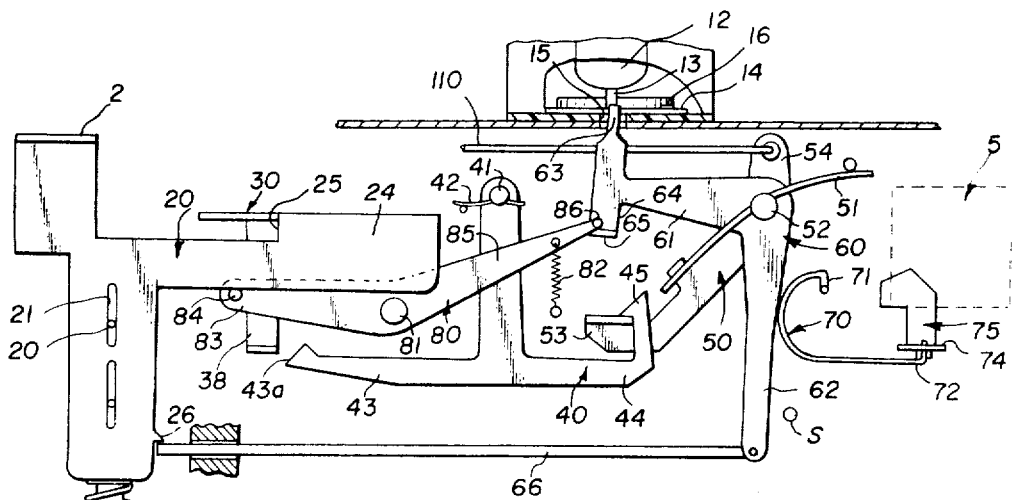
FIG. 4 is a view similar to FIG. 2 but with the apparatus in signalling and/or controlling position.
Figure 4A:
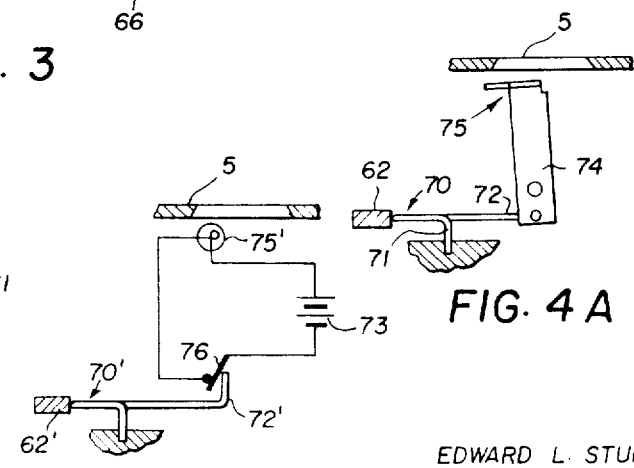
FIG. 4a is a top view of a portion of the apparatus shown in FIG. 4.

The spring wire 70 and its associated elements can best be seen by referring briefly to FIG. 4a and include a fixed end 71 and tail portion 72. The restoring forces in the spring 70 urge free portions of the spring 70 leftward. When the tail 72 of the spring moves to the left it moves an attached end 74 of a flag 75 in that direction, causing the flag to rotate clockwise as viewed in FIG. 4a and into the viewfinder 5 of the camera.

A crank 80 is rotatably mounted on pin 81 and biased clockwise by spring 82. The crank has an input arm 83 with a pin 84 thereon located to cooperate with shutter release lever 20 and an output arm 85 with an end 86 that is urged against pad 65 of member 60 by spring 82 with a sufficient force to hold member 60 against stop S, overriding the bias of spring 70 so long as the end 86 rests on pad 65.

The operation of the parts of the apparatus thus far described will now be explained. It can be seen that when shutter release lever 20 is depressed slightly as shown in FIG. 1, the pin 84 of crank 80 is contacted by the lever 20 and pivoted counterclockwise against the bias of spring 82. This movement of crank 80 lifts end 86 from the pad 65 and allows spring 70 to move and rotate lever 60 slightly clockwise, thus moving finger 63 through the actuating opening 8 of the camera housing, the access site 15 of an inserted flash unit 10 and into contact with a striking element 14 that is located in the pre-energized position over the site 15. The force of spring wire 70 is not sufficient to dislodge the pre-energized striker 14 so that movement of the sensing arm 60 is stopped by the striker 14 until the shutter release lever 20 has been further depressed to release shutter driver 30. It could be seen in FIG. 2, that when lever 60 has rotated to the position in which finger 63 touches the striker 14, spring end 72 has not moved sufficiently to move warning flag 75 into the viewfinder 5. Also, it can be seen that in this position of lever 60 the blocking rod 66 connected to control arm 62 has not moved sufficiently to prevent further movement of the shutter release lever 20.

Figure 3:
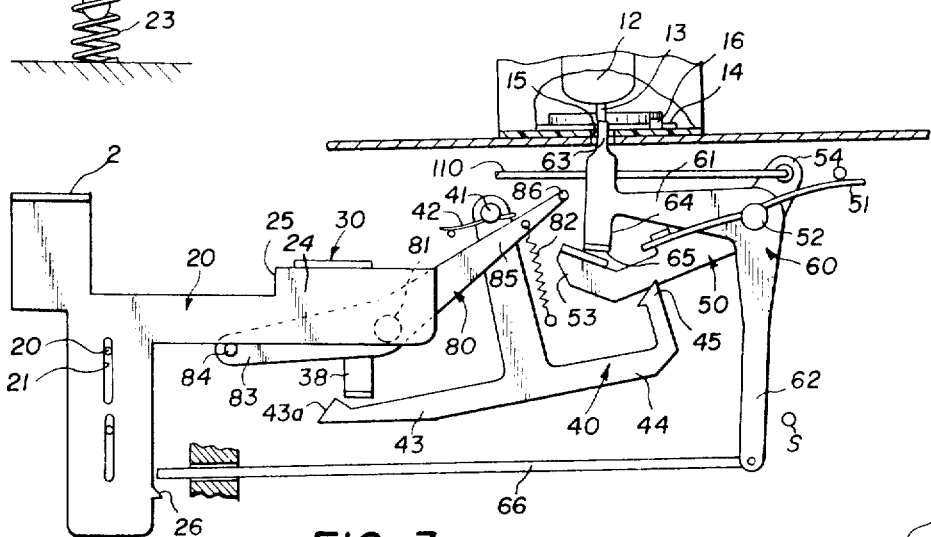
FIG. 3 is a view similar to FIG. 2 but with the apparatus in the position after an actuation of flash lamp firing.

The shutter release lever 20, being free for further downward movement, therefore can release the shutter driver 30. During the rightward shutter actuating movement of shutter driver 30, the extension 38 contacts and rotates latch member 40 counterclockwise to release hammer 50. Upon release, the hammer 50 quickly moves under the bias of spring 51 to strike extension 64 of member 60 causing the finger 63 to dislodge striker 14 and thereby actuate percussion firing of the flash lamp 2. At this state of operation, the parts have moved to the positions shown in FIG. 3.

Referring now to FIG. 4, the apparatus shown in FIGS. 2 and 5 is shown at the stage of movement of shutter release lever 20 immediately prior to its release of shutter driver 30, and in this instance with a flash unit 10 having a de-energized striker 14. It can be seen that because the striker 14 is not over access site 15, the sensing finger 63 is free to move further upward allowing a further rotation of lever 60 prior to release of shutter driver 30. The further rotation of lever 60 in turn allows the end 72 of spring 70 to move further left, moving warning flag 75 into the viewfinder 5. It also will be seen that the further clockwise rotation of lever 60 causes blocking arm 66 to move further left and into a blocking position beneath stop lug 26 of shutter release 20. The shutter release therefore cannot move further downward so that shutter driver 30 cannot be released.

It will therefore be appreciated that the picture-taking operation of the camera has been prevented in response to a sensing by lever 60 that the striker 14 of the flash unit 10 was not operative to effect flash. It will further be appreciated that either the linkage, including rod 66, for controlling the picture-taking operation or the signal linkage, including warning flag 75, can be used independently in photographic apparatus. In using the signal linkage without the control linkage, the operator can merely partially depress shutter release 20 to determine if the positioned flash unit is operative and if no signal appears continue depression of the shutter release to make a photographic flash exposure.

If the control linkage is used independently, the condition of the inserted flash unit is indicated by the fact that the shutter cannot be released.

Figure 4B:
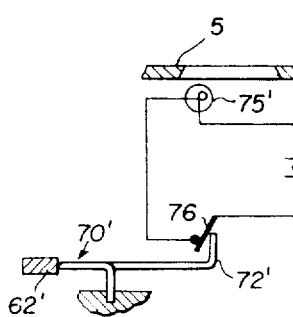
FIG. 4b is a top view of a portion of the apparatus shown in FIG. 4 but showing another embodiment of signal mechanism.

Referring now briefly to FIG. 4b, it can be seen that the spring 70 can be used to electrically signal a sensed lamp condition. As shown in FIG. 4b, the end 72' of spring 70' forms one contact of a circuit from electrical source 73 to signal lamp 75' in the viewfinder 5. When the finger 63 lever of lever 60 has moved past point where it is contactable with an energized striker 14 of flash unit 10, the contact 72' closes the circuit by contacting the other contact 76 of the circuit and the lamp 75' is energized to warn the operator that the flash unit is not operative. The position of the contacts could of course be arranged to maintain the lamp 75' on when the flash unit is operative and off when the lever 60 has moved to the position shown in FIG. 4, indicating an inoperative condition in the flash unit. The signal flag 75 shown in FIG. 4a can be similarly modified to signal an operative rather than inoperative flash unit condition.

Figure 6:
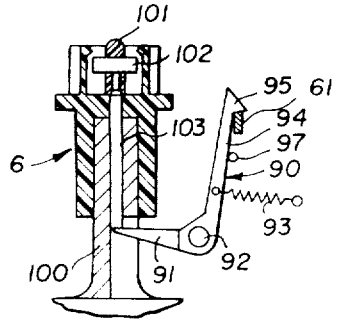
FIG. 6 is a sectional view taken generally along the line 6—6 indicated in FIG. 2 and showing the apparatus socket and sensing and control mechanism associated therewith.

Referring now to FIGS. 2 and 6, the control mechanism for lever 60 will be described. In FIG. 2, the socket 6 can be seen to extend inside camera housing 7 to a location adjacent a control lever 90. The socket 6 is cored and rotatably mounted on a camera frame post 100 which is also cored. The socket includes a support stud 101 adapted to fit within the hollow post (not shown) on the base of an inserted flash unit of the type described in aforementioned U.S. application Ser. No. 765,930, entitled "Multilamp Flash Unit" and filed on Oct. 8, 1968, in the name of David E. Beach. A tee-bar 102 is supported in stud 101 for vertical sliding movement and contact with a plunger rod 103 within the cores of socket and camera frame post 100. The bottom end of rod 103 is positioned for contact with actuating arm 91 of lever 90. The lever 90 is rotatably mounted on pin 92 and urged clockwise by spring 93. The control lever 90 also includes a control arm 94 having latch portion 95 formed thereon.

It can be seen in FIG. 6 that when a flash unit 10 is mounted in socket 6, the tee-bar 101 moves downwardly causing plunger 103 to move lever 90 counterclockwise against spring 93 and release the arm 61 of lever 60. In this condition with the arm 61 free, the sensing and control mechanism described above can operate as explained above in response to used or unused flash lamps in the inserted unit. However, when no flash unit is in socket 6, the spring 93 moves the lever 90 clockwise against post 97 and latch 95 prevents operation of the sensing lever 60, thereby avoiding the protrusion of finger 63 through housing opening 8 when no lamp is inserted on the camera.

During film advancing movement of lever 3, the cocking lever 109, which is shown in FIG. 2 and operatively associated with film advance lever 3 in a known manner is moved to the left causing drag link 110 to move hammer 50 from the position shown in FIG. 4 back to its latched position shown in FIG. 2. The remaining parts are returned to their original positions by spring 23 moving the shutter release lever 20 to its original position and by the forces of their individual positioning springs. The shutter driver 30 is cocked and socket 6 indexed in known manners during film advance and the camera is again ready for another cycle of operation.

The invention has been described in detail with particular reference to preferred embodiments thereof, but it will be understood that variations and modifications can be effected within the spirit and scope of the invention.

I claim:

1. A camera mechanism for use with a disposable flash unit of the type having a plurality of lamps fireable by striking and a striking mechanism associated with each lamp, the striking mechanism including a striker and means for releasably retaining the striker in an energized position, the striking mechanism having a surface engageable for release of the striker, said camera mechanism comprising:
   a. means for receiving such a flash unit with a flash lamp positioned at a firing site;
   b. an actuating member movable into engagement with the engageable surface of the striking mechanism for said lamp;
   c. means for moving said actuating member into nonreleasing engagement with the engageable surface; and
   d. means for applying enough force to said actuating member when in said non-releasing engagement to release said striker.

2. A camera mechanism for use with a disposable flash unit of the type having a plurality of lamps fireable by striking and a striking mechanism associated with each lamp, the striking mechanism including a striker and means for releasably retaining the striker in an energized position, the striking mechanism having a surface engageable for release of the striker, said camera mechanism comprising:
   a. means for receiving such a unit with a flash lamp positioned at a firing site;
   b. an actuating member movable into engagement with the engageable surface of the striking mechanism for said lamp;
   c. means for moving said actuating member into nonreleasing engagement with the engageable surface; and
   d. means for striking said actuating member when in said non-releasing engagement to release the striker.

3. A camera mechanism for use with flash units of the type having at least one lamp fireable by striking, an individual striker that is movable between an energized first position and a second position for effecting the striking and firing of the lamp and means for releasably restraining the striker in its energized posi-tion, said camera mechanism comprising:
   a. means for detachably receiving such a flash unit;
   b. a shutter release lever movable from a first position to a third position through a second position;
   c. means responsive to movement of said shutter release lever from said second position to said third position for actuating a shutter to effect an exposure;
   d. an actuating member movable into engagement with a striker of a flash unit received by said receiving means;
   e. means for moving said actuating member into nonreleasing engagement with the striker in response to movement of said shutter release lever from said first position to said second position; and
   f. means for applying enough force to said actuating member to release said striker in response to movement of said shutter release lever from said second position to said third position.

4. The camera mechanism according to claim 3 wherein said means for applying force to said actuating member includes a hammer movable between an energized first position and a second position for striking said actuating member, means for releasably retaining said hammer in its energized position and means for releasing said hammer from its energized position in response to movement of said shutter release lever from its second position to its third position.

5. The invention according to claim 3 wherein said means for actuating a shutter is a shutter driver movable from an energized first position toward a second position to effect actuation of said shutter and said means for applying force to said actuating member is a releasably energizeable hammer releasable by said shutter driver during movement from its energized first position to its second position.

6. A camera mechanism for use with flash units of the type having at least one lamp fireable by striking, an individual striker that is movable between an energized first position and a second position for effecting the striking and firing of said lamp, means for releasably restraining the striker in its energized position and a base having an access opening through which the striker can be released, said camera mechanism comprising:
   a. a wall member having an actuating opening;
   b. means for receiving such a flash unit with its access opening aligned with said actuating opening;
   c. means movable through said aligned openings for releasing the striker associated with the access opening, said means being adjustable between a first condition in which said means is not movable through said openings to actuate the striker, and a second condition in which said means is movable through said openings to actuate said striker; and
   d. means for adjusting said actuating means from its first condition to its second condition in response to insertion of a flash unit in said receiving means.

7. Photographic apparatus for use with photoflash units, which units have at least one flash lamp fireable by striking and at least one releasable pre-energized striker for each such lamp, said apparatus comprising:
   means for detachably receiving such a photoflash unit with a pre-energized striker thereof in a pre-determined position relative to said receiving means;
   a sensing member movable from a first position toward a third position through a second position, in which second position said member is restrainable by a pre-energized striker in said predetermined position;
   means for urging said member from said first position toward said third position with sufficient force to move said member to its third position if there is no pre-energized striker in said predetermined position but with insufficient force to move said member past said second position if there is a pre-energized striker in said predetermined position;
   signalling means controlled by said sensing member for indicating to an operator that said sensing member is in its third position; and
   means for applying a force to said sensing member in addition to that applied by said urging means to move said sensing member toward its third position to release a pre-energized striker located at said predetermined position to fire the lamp associated therewith.

8. A camera for use with a flash unit of the type having a plurality of lamps fireable by striking, a striker associated with each lamp for effecting such striking and means for releasably retaining each such striker in an energized position, said camera comprising:
   means for receiving such a unit with a flash lamp positionable at a firing site;
   an actuating member movable into nonreleasing engagement with an energized striker for such lamp;
   means for moving said actuating member into nonreleasing engagement with said striking member with enough force to move said actuating member beyond said position of nonreleasing engagement if the striker for the lamp is not in its energized position;
   means for applying enough force to said actuating member when in said nonreleasing engagement to release the striker;
   a controllable camera component; and
   means responsive to movement of said actuating member past said position of nonreleasing engagement for controlling a function of said component.

9. A camera according to claim 8, wherein said camera component is a signalling means for signalling the absence of a striker in its energized condition to an operator thereby indicating that the lamp positionable at said firing site will not fire.

10. The camera mechanism according to claim 8, wherein said camera component includes means for preventing picture-taking actuation of said camera when said moving means has moved said actuating member past said position of nonreleasing engagement.

11. A camera for use with a flash unit of the type having a plurality of lamps fireable by striking, a striker associated with each lamp for effecting such striking and means for releasably retaining each such striker in an energized position, said camera comprising:
   means for receiving such a unit with a flash lamp positioned at a firing site;
   an actuating member movable into releasing engagement with the energized striker for such lamp;
   means for moving said actuating member into nonreleasing engagement with such striker with enough force to move said actuating member beyond said position of nonreleasing engagement if the striker for the lamp is not in its energized position;
   means for applying enough force to said actuating member when in said nonreleasing engagement to release the striker;
   a controllable camera component;
   means responsive to movement of said actuating member past said position of nonreleasing engagement for controlling a function of said component; and
   means for at least partially controlling the movement of said actuating member in response to receipt of a flash unit in said receiving means.

12. A camera mechanism for use with flash units of the type having at least one lamp fireable by striking, an individual striker that is movable between an energized first position and a second position for effecting the striking and firing of the lamp and means for releasably restraining the striker in its energized position, said camera mechanism comprising:
   means for detachably receiving such a flash unit;
   a shutter release lever movable from a first position to a third position through a second position;
   means responsive to movement of said shutter release lever from said second position to said third position for actuating a shutter to effect an exposure;
   an actuating member movable into engagement with a striker in its energized first position of a flash unit receivied by said receiving means;
   means for applying a first force to said actuating member in response to movement of said shutter release lever from said first position to said second position, said first force being of sufficient magnitude to move said member into nonreleasing engagement with a striker in its energized first position, said force being of sufficient magnitude to move said member past said position of non-releasing engagement if the striker is in its second position;
   means for controlling a function of a component of said camera mechanism in response to movement of said actuating member past said position of nonreleasing engagement; and
   means for applying enough force to said actuating member to release a striker from its first position in response to movement of said shutter release lever from its second position to its third position.

13. Photographic apparatus for use with photoflash units, which units have at least one flash lamp fireable by striking and one releasable, energized striking element for each such lamp, said apparatus comprising:
   means for detachably receiving such a photoflash unit with an energized striker thereof in a predetermined position;
   a sensing member movable along a path from a first position to a third position through a second position, which path is blockable by an energized striker in said predetermined position;
   means for applying a force to said sensing member, which force is sufficient to move said sensing member from its first position to its third position if there is no energized striker blocking said path, but insufficient to move said member past its second position if an energized striker is blocking said path, thereby sensing the presence or absence of a striker at said predetermined position; and
   means for applying a force to said sensing member sufficient to release a striker located at said predetermined position to fire the lamp associated therewith.

* * * * *